(12) United States Patent
Schmidlin et al.

(10) Patent No.: US 10,261,530 B2
(45) Date of Patent: Apr. 16, 2019

(54) CONTROL DEVICE, COMPONENTS, AND MOBILE SERVICE DEVICE FOR AN HVAC SYSTEM

(71) Applicant: BELIMO HOLDING AG, Hinwil (CH)

(72) Inventors: Peter Schmidlin, Uster (CH); Silvio Grogg, Gossau (CH)

(73) Assignee: BELIMO HOLDING AG, Hinwil (CH)

( * ) Notice: Subject to any disclaimer, the term of this patent is extended or adjusted under 35 U.S.C. 154(b) by 688 days.

(21) Appl. No.: 14/761,061

(22) PCT Filed: Jan. 16, 2014

(86) PCT No.: PCT/EP2014/000113
§ 371 (c)(1),
(2) Date: Jul. 15, 2015

(87) PCT Pub. No.: WO2014/131485
PCT Pub. Date: Sep. 4, 2014

(65) Prior Publication Data
US 2015/0362928 A1    Dec. 17, 2015

(30) Foreign Application Priority Data

Feb. 28, 2013 (CH) .......................... 523/13

(51) Int. Cl.
*G05B 13/00* (2006.01)
*G05D 23/19* (2006.01)
(Continued)

(52) U.S. Cl.
CPC ..... *G05D 23/1917* (2013.01); *G05B 19/0426* (2013.01); *H04W 4/80* (2018.02);
(Continued)

(58) Field of Classification Search
CPC .................. G05D 23/1917; G05D 19/0426
(Continued)

(56) References Cited

U.S. PATENT DOCUMENTS 5,844,888 A    12/1998  Markkula, Jr. et al.
6,330,806 B1 *  12/2001  Beaverson ............. F24F 11/006
                                                              236/51

(Continued)

FOREIGN PATENT DOCUMENTS

EP    1 736 843 A1    12/2006
WO    01/67005 A1     9/2001
(Continued)

OTHER PUBLICATIONS

Communication dated Oct. 20, 2017 from the Russian Patent Office in counterpart application No. 2015141017/11.
(Continued)

*Primary Examiner* — Sean Shechtman
*Assistant Examiner* — Sheela Rao
(74) *Attorney, Agent, or Firm* — Sughrue Mion, PLLC (57) ABSTRACT

The invention relates to a control apparatus (3) for an HVAC system (5), wherein the control apparatus (3) has a communication module (33) for communicating with one or more components of the HVAC system (5). The control apparatus comprises a passive NFC transponder (34), which is set up to receive and store a unique identifier (341) of each of the one or more components from a mobile service apparatus (2) before a power supply for the control apparatus (3) is switched on, and a control module (35) which is set up to access stored identifiers (341) after a power supply for the control apparatus (3) has been switched on and to transmit control signals to components determined by the identifiers via the communication module (33). The invention also relates to a mobile service apparatus (2) and to components (Continued)

in the form of drives (1), sensor apparatuses, regulators, operating devices and/or communication devices of the HVAC system (5).

20 Claims, 4 Drawing Sheets

(51) Int. Cl.
  *G05B 19/042* (2006.01)
  *H04W 4/80* (2018.01)
(52) U.S. Cl.
  CPC .......... *G05B 2219/2228* (2013.01); *G05B 2219/25066* (2013.01); *G05B 2219/25092* (2013.01); *G05B 2219/25296* (2013.01); *G05B 2219/25297* (2013.01); *G05B 2219/2614* (2013.01)
(58) Field of Classification Search
  USPC .......................................................... 700/276
  See application file for complete search history.

(56) References Cited

U.S. PATENT DOCUMENTS

| | | | |
|---|---|---|---|
| 8,751,065 B1* | 6/2014 | Kato | H04M 1/72533 340/426.13 |
| 2006/0200256 A1* | 9/2006 | Mason | G05B 19/054 700/65 |
| 2008/0102754 A1* | 5/2008 | Heinemann | G05B 19/4183 455/41.2 |
| 2010/0097238 A1* | 4/2010 | Dupielet | G05B 19/0426 340/4.3 |

FOREIGN PATENT DOCUMENTS

| | | |
|---|---|---|
| WO | 2006/056532 A1 | 6/2006 |
| WO | 2006097760 A1 | 9/2006 |

OTHER PUBLICATIONS

International Search Report of PCT/EP2014/000113 dated May 8, 2014.

* cited by examiner

CONTROL DEVICE, COMPONENTS, AND MOBILE SERVICE DEVICE FOR AN HVAC SYSTEM

CROSS REFERENCE TO RELATED APPLICATIONS

This is a National Stage of International Application No. PCT/EP2014/000113 filed Jan. 16, 2014, claiming priority based on Swiss Patent Application No. 00523/13 filed Feb. 28, 2013, the contents of all of which are incorporated herein by reference in their entirety.

TECHNICAL FIELD

The invention relates to a control device for an HVAC system, a mobile service device for configuring an HVAC system, and to a method for configuring an HVAC system.

PRIOR ART

HVAC systems (HVAC: Heating, Ventilation, and Air Conditioning) comprise a plurality of consumers that are arranged distributed in branches or lines and that are supplied with a liquid or gaseous fluid. To obtain a desired distribution of the fluid to the consumers, equalizing or regulating or balancing units are provided, for instance adjustable control elements, especially valves, wherein the flow through specific consumers is adjusted using different size openings or valve settings. In addition to the arrangement of the consumers with the associated lines, mounts, etc., installation of HVAC systems also requires demand-appropriate installation of the equalizing or regulating and balancing units that must satisfy individual requirements at different locations. For instance, depending on requirements a regulating and balancing unit for a general office must have very different parameters than a regulating and balancing unit for an open-plan office. In other HVAC applications, a plurality of regulating and balancing units configured as slaves are allocated to one regulating and balancing unit that is configured as a master.

In such configurations the regulating and balancing units must also have individual parameter settings and in addition it must be assured that the slaves must be correctly allocated to the master.

Certain individual parameters of regulating and balancing units of an HVAC system must be undertaken directly during the installation of the regulating and balancing unit. Thus, currently individual parameters of the regulating and balancing units are adjusted for instance by rotating a potentiometer position with a screwdriver or by connecting and operating a service tool using a service socket.

U.S. Pat. No. 7,898,147 illustrates an electronically configurable actuator. The actuator comprises an electrically controllable mechanical converter, a wireless interface for receiving data related to operation of the actuator and at least one external device thereof, a settings data module for storing the data, a wired interface for administering external devices based on the data, and a control module for controlling the mechanical converter corresponding to the data. The wireless interface is set up for transmitting radio-based, optical, or acoustic signals, for instance in accordance with a standard such as Bluetooth, IrDA, IEEE 802.11 (WLAN), HomeRF, etc., or in accordance with a mobile communications technique. Data may be prepared on a portable computer, a PDS (personal digital assistant), or a mobile telephone and transmitted to the actuator via the wireless interface.

U.S. Pat. No. 6,667,690 illustrates the configuration of a communications network for an HVAC system, especially the identification of an HVAC device in an HVAC system and the allocation of a network address. The HVAC devices each have an RFID transponder whose identification is transmitted to a technician's portable device if the portable device is brought into the transmission range of the RFID transponder. Based on a floor plan, the technician selects the location of the HVAC device on the portable device, whereupon a network address for this location is determined, for instance based on a data base, using the portable device. The identification of the RFID transponder and the network address are preferably transmitted to a communications device via an infrared interface.

DESCRIPTION OF THE INVENTION

It is an object of the present invention to suggest a control device for an HVAC system, a mobile service device for configuring an HVAC system, a method for configuring an HVAC system, and a drive for an HVAC system, that prevent or reduce at least certain drawbacks of the prior art. It is especially an object of the present invention to suggest a control device for an HVAC system, a mobile service device for configuring an HVAC system, a method for configuring an HVAC system, and a drive for an HVAC system, that make it possible to perform the configuration of the HVAC system prior to switching on the power supply for the HVAC system.

In accordance with the present invention, these goals are attained using the elements of the independent claims. In addition, other advantageous embodiments proceed from the dependent claims and the description.

A control device for an HVAC system, which control device has a communications module for communicating with one or a plurality of components in the HVAC system, comprises: a passive NFC transponder that is set up to receive and store a unique identifier for each of the one or plurality of components from a mobile service device prior to a power supply for the control device being switched on, and a control module that is set up to access stored identifiers after a power supply for the control device has been switched on and to transmit control signals to components determined by the identifiers via the communications module. The configuration of the drives and control device of an HVAC system may occur at a point in time at which the devices in question are not yet connected to a power supply. In particular this makes it possible to prevent it being necessary for technicians to search multiple times for these devices during the installation of an HVAC system and for electricians who are not familiar with the configuration of HVAC systems to be able concentrate on the electrical wiring for connecting the HVAC system to its power supply without having to know the arrangement, connection, and configuration of components of the HVAC system. The NFC transponder is housed, for instance, in or on a housing of the control device. In one variant, the NFC transponder is attached separately from the housing of the control device and is connected to the control device via a cable.

It is important to establish that the term "configuring" relates to configuring drives and control devices for the HVAC system before a power supply is switched on. In contrast, the term "communicating" relates to the transfer of control signals, etc., between the control devices and the drives of the HVAC system after a power supply has been switched on.

In one embodiment of the control device, the passive NFC transponder and the control module are set up to receive and store identifiers and to transmit control signals related to a sensor device of the HVAC system, a drive of the HVAC system, a regulating device of the HVAC system, a room control unit of the HVAC system, a gateway for communication between different communications networks of the HVAC system, an actuator of the HVAC system, and/or an interface device for input and output signals of the HVAC system. A regulating device of the HVAC system is set up, for instance, for determining a control signal for some component of the HVAC system based on some input signal. A gateway for communication between different communications networks of the HVAC system is set up, for instance, to enable communication between different protocols. An actuator of the HVAC system comprises for instance a fan, a cooling unit, a heating unit, etc. An interface device for input and output signals of the HVAC system is set up, for instance, to detect, record, etc. operating values of the HVAC system.

In one embodiment of the control device, the control module is set up to transmit, after a power supply for the control device is switched on, control signals to components determined by the identifiers, which control signals query whether the component in question is available. This makes it possible to check whether the components are correctly installed.

In one embodiment of the control device, the passive NFC transponder is set up to receive and store component parameters allocated to the identifiers, wherein the control module is set up to transmit control signals corresponding to the component parameters to components determined by the identifiers. The component parameters may be stored on the control device and transmitted to the components as needed.

In one embodiment of the control device, the control module is set up to transmit control signals to components, which control signals query component parameters of the components, wherein the control module is set up to transmit control signals corresponding to the component parameters to components determined by the identifiers. The component parameters, e.g. a room designation or a maximum flow, may be stored on the component during configuration and when the HVAC system is started up the control unit may call up these component parameters as needed.

In one embodiment of the control device, the control module is set up to produce a protocol that includes a switch-on time for a power supply for the control device, a query time, and status of the availability of components and/or component parameters, with information about whether they are stored on the NFC transponder or were queried at a component. The protocol may be produced when the HVAC system is started up and may include all necessary information with which it is possible to check whether the components were installed as planned.

In one embodiment of the control device, the control module is set up to execute one or a plurality of the following steps: transmit the protocol to a receiver if a communications link to the receiver is available, and store the protocol on the NFC transponder. The protocol may be transmitted to a receiver or may be stored on the NFC transponder, for instance for supporting service work on the HVAC system. The receiver may be arranged inside or outside of the HVAC system and may comprise for instance a mobile communications device for a project manager who monitors the installation of the HVAC system. Alternatively or in addition, a receiver may be arranged in a control center in which the installation of the HVAC system is monitored.

In one embodiment of the control device, the control module is set up to detect operating values of the HVAC system of the components determined using the identifiers and to transmit control signals to related components corresponding to the detected operating values.

In one embodiment of the control device, the latter comprises one or a plurality of the following components: a sensor device for the HVAC system, a drive of the HVAC system, a regulating device of the HVAC system, a room control unit of the HVAC system, a gateway for communication between different communications networks of the HVAC system, an actuator for the HVAC system, and an interface device for input and output signals of the HVAC system.

In addition to a control device for an HVAC system, the invention relates to a mobile service device for configuring a control device of an HVAC system and of one or a plurality of components of the HVAC system before a power supply is switched on. The mobile service device comprises: a control module that is set up to control an active NFC module of the mobile service device such that an identifier stored in a passive NFC transponder is read out from the one or plurality of components, and one or a plurality of read-out identifiers are written to a passive NFC transponder of the control device.

In one embodiment of the mobile service device, the control module is set up such that a user interface of the mobile service device indicates identifiers of the components of the HVAC system and receives component parameters of the components allocated to these identifiers from a user of the mobile service device, wherein the control module is also set up to control the active NFC module such that component parameters are written to passive transponders of components of the HVAC system and/or are written to a passive transponder of a control device for the HVAC system.

In one embodiment of the mobile service device, the control module is set up to combine a plurality of identifiers of the components into one group, to allocate available group and component parameters to components of the group, and to control the NFC module such that the group is written to the NFC transponder of a control device of the HVAC system.

In one embodiment of the mobile service device, the control module is set up to produce a protocol that comprises one or a plurality of the following contents: received identifiers of components of the HVAC system, component parameters allocated to the identifiers, groups with identifiers and groups and/or component parameters allocated to the identifiers, identification of an operator of the service device, and time stamps allocated to the aforesaid contents, wherein the control module is especially set up to transmit the produced protocol to a receiver.

In addition to a control device and a mobile service device for an HVAC system, the invention relates to a method for configuring a control device for an HVAC system and one or a plurality of components of the HVAC system before a power supply is switched on. The method comprises the following steps: reading out an identifier from a passive NFC transponder of the one or plurality of components with an active NFC module, and writing read-out identifiers to a passive NFC transponder of the control device with the active NFC module.

In one embodiment of the method, identifiers are displayed on a user interface and allocated component parameters are detected, wherein detected component parameters are written to a passive NFC transponder of the one or plurality of components and/or to the passive NFC transponder of the control device with the active NFC module.

In one embodiment of the method, a protocol is produced that comprises read-out identifiers of the one or plurality of components, component parameters allocated to the identifiers, and/or time stamps allocated to these contents, wherein the protocol is transmitted in particular to a receiver.

In addition to a control device, a mobile service device for an HVAC system, and a method for configuring an HVAC system, the invention relates to a computer program product comprising a computer-readable storage medium that has program code stored thereon and that is set up to control one or a plurality of processors of a mobile service device that has an active NFC module such that: an identifier is read out of a passive NFC transponder of one or a plurality of components of an HVAC system with the active NFC module, and read-out identifiers are written to a passive NFC transponder of a control device of the HVAC system with the active NFC module.

In addition to a control device, a mobile service device for an HVAC system, a method for configuring an HVAC system, and a computer program product, the invention relates to a drive for an HVAC system, which drive has an actuator for a control element of the HVAC system. The drive further comprises: a passive NFC transponder that is set up to transmit a unique identifier to a mobile service device before a power supply for the drive is switched on and to receive and store from the mobile service device one or a plurality of drive parameters, and a control module that is set up to control the actuator after a power supply for the drive is switched on, taking into account the one or a plurality of stored drive parameters.

In one embodiment of the drive, the latter comprises a communications module for communicating with a control device of the HVAC system and the control module is set up to receive via the communications module, and before a power supply for the drive is switched on, control signals for controlling the actuator and to control the actuator.

In one embodiment of the drive, the control module is set up to transmit a confirmation to the control device after a power supply for the drive is switched on and upon receipt via the communications module of a control signal from a control device, with which signal the availability of the drive is checked.

In one embodiment of the drive, the control module is set up to transmit the one or plurality of drive parameters to the control device upon receipt via the communications module of a control signal from a control device, with which control signal the one or a plurality of drive parameters are queried.

In one embodiment of the drive, the control device is set up to detect operating values of the HVAC system via a sensor interface and to transmit these operating values to a control device via the communications interface.

In one embodiment of the drive, the NFC transponder has a plurality of differently arranged transponder antennas. The transponder antennas are preferably attached to different parts of a housing of the drive such that there is cooperation between the active NFC module of the mobile service device and the NFC transponder for different positions of the mobile service device relative to the drive.

In one embodiment of the drive, the NFC transponder has two transponder antennas that are attached to or in the housing of the drive such that at least one of the two transponder antennas remains freely accessible after the drive is assembled, especially on a side of the housing of the drive that faces a wall or cover.

In one embodiment of the drive, the passive NFC transponder is set up to receive and store drive parameters from a plurality of drives of the HVAC system.

BRIEF DESCRIPTION OF THE DRAWINGS

The invention is explained in the following using figures, which merely depict exemplary embodiments.

WAYS TO EXECUTE THE INVENTION

Figure 1:
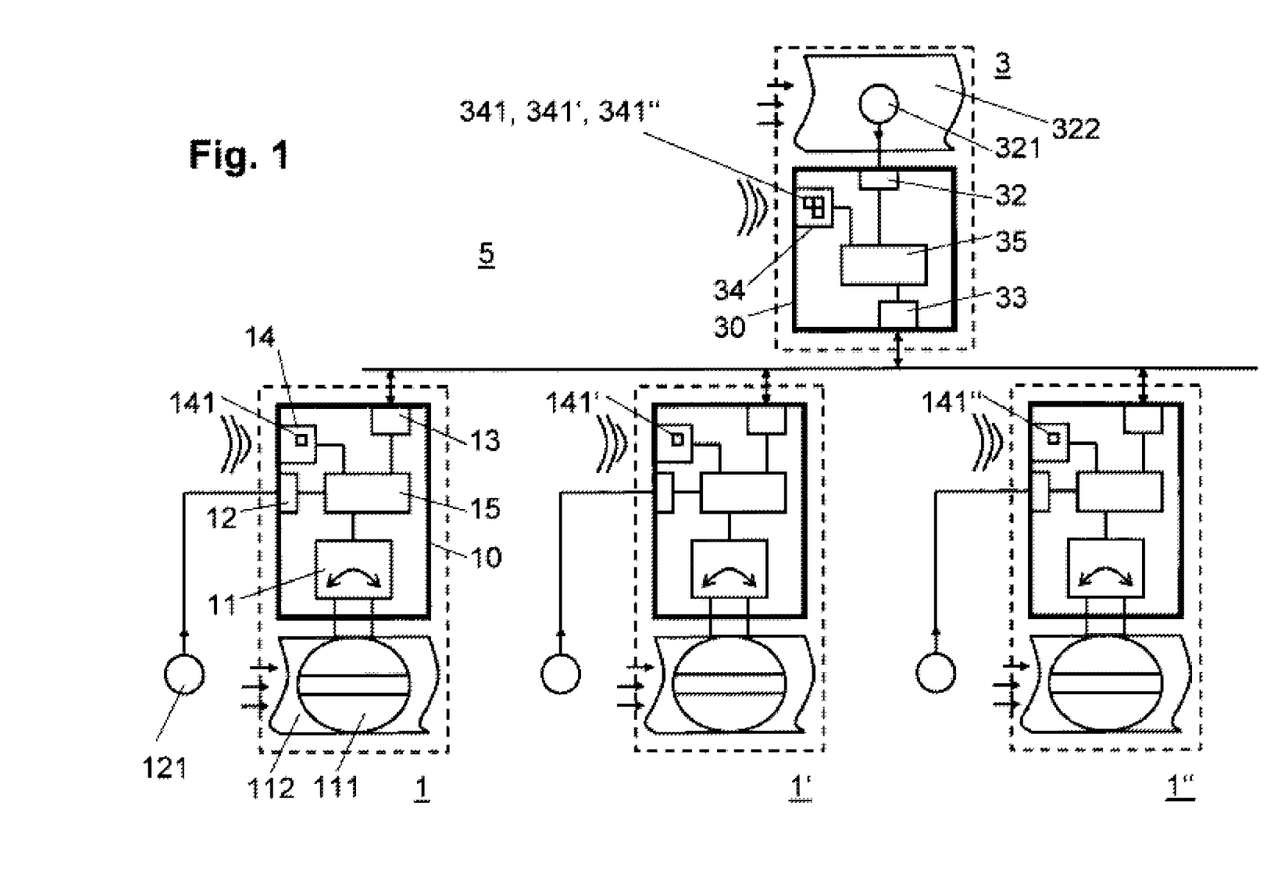
FIG. 1 is a schematic depiction of a control device of an HVAC system.

FIG. 1 is a schematic representation of a control device 3 for an HVAC system 5 and a plurality of components for the HVAC system 5. The components are shown in the example depicted in FIG. 1 as drives 1, 1', 1".

The HVAC system 5 comprises a fluid transport system having water lines or air channels through which liquid or gaseous fluid is transported. The control device 3 depicted in FIG. 1 and the drives 1, 1', 1" are set up for operating such an HVAC system 5, wherein in particular HVAC operating values such as through-flow, temperature, etc., are detected and processed on the control device 3 in order to control the drives 1, 1', 1".

To enhance clarity, in FIG. 1 only reference numbers for the drive labeled 1 are included. For the drives with reference numbers 1' and 1", only one of the most important reference numbers is provided. The schematically depicted components of drive 1, 1', 1" are illustrated in the following for the drive having the reference number 1, but apply accordingly for the drives having the reference numbers 1' and 1". In the following, the term "the drives 1" always refers to the three drives that are depicted in FIG. 1 and that have the reference numbers 1, 1', 1".

Three drives 1 are illustrated in the example depicted in FIG. 1. However, the invention relates to any number of drives 1.

The control device 3 and the drives 1 have communications modules 33, 13. The communications modules 33, 13 are connected to one another via a communications medium and are set up to transmit control signals between the control device 3 and the drives 1. The communications medium includes for instance cables, such as e.g. a Belimo MP-Bus cable, wireless-based media such as e.g. GSM (Global System for Mobile Communication) or WLAN (Wireless Local Area Network), optical data connections, etc. The communications modules and the communications medium are in particular set up in accordance with one or a plurality of the following standards: Belimo MP-Bus, LonWorks, Modbus RTU, EIB/Konnex, BACnet, and/or Profibus DP. The control signals define functions that are necessary for operating the HVAC system 5, for instance functions with which the control device 3 may transmit a control signal for adjusting a drive position on the drives 1 or the drives 1 may transmit a status signal about the adjusted position to the control device 3.

As is depicted schematically in FIG. 1, the control device 3 and the drives 1 have control modules 35, 15. The control modules 35, 15 comprise for instance microprocessors and programs that may be executed thereon, ASICs (ASIC: Application-Specific Integrated Circuit), or other electronic circuits with which are made possible the functions that are necessary for operating the control device 3 and for operating the drives 1, which functions shall be described in detail in the following. As is depicted schematically in FIG. 1, the control module 35, 15 and the HVAC interface 33, 13 of the control device 3 and of the drives 1 are each housed in a housing 30, 10.

In one embodiment, the control device 3 comprises a fluid connection 322 that is set up for connecting the fluid transport system for the HVAC system 5. The fluid connection 322 is embodied for instance as a water pipe or air channel, the two ends of which may be attached to other water pipes or air channels of the HVAC system 5. The fluid connection 322 may be attached to the housing 30 of the control device 3, which together form a unit depicted with the broken line in FIG. 1. As illustrated in FIG. 1, the fluid connection 322 comprises a fluid sensor 321 with which for instance the through-flow quantity, temperature, etc. of the fluid is measured. The fluid sensor 321 is connected to a sensor interface 32 of the control device 3 via a signal line. The sensor interface 32 is attached for instance to the housing of the control device.

In one embodiment, a drive 1 comprises a fluid connection 112 that is set up for connecting to the fluid transport system of the HVAC system 5. The fluid connection 112 is embodied for instance as a water pipe or air channel, the two ends of which may be attached to other water pipes or air channels of the HVAC system 5. The fluid connection 112 may be attached to the housing 10 of the drive 1 such that the housing 10 and the fluid connection 112 together form a unit, illustrated in FIG. 1 with the broken line. As FIG. 1 illustrates, the fluid connection 112 comprises a control element 111 with which in particular the through-flow quantity of the fluid is influenced. The control element 111 may be embodied as a water valve or air valve. The control element 111 is operatively connected to an actuator 11 of the drive 1. The actuator 11 is housed for instance in the housing 10 of the drive 1. The actuator 11 comprises a motor, an electric motor, an oil pump, etc. with which a mechanical force is generated in order to move the control element 111 arranged in the fluid connection 112 into a required position.

In one embodiment, the drives 1 comprise a sensor interface 12 that is arranged for instance on the housing 10 of the drives 1. A sensor 121 may be connected to the sensor interface 12 via a signal line in order to detect operating values for the HVAC system 5, such as for instance, temperature, through-flow quantity, etc. of the HVAC system 5.

As is depicted schematically in FIG. 1, in the control device 3 the control module 35 is connected to the communications module 33 and to the sensor interface 32. Likewise, in the drives 1 the control module 15 is connected to the communications module 13, the actuator 11, and the sensor interface 12.

As is depicted schematically in FIG. 1, the control device 3 and the drives 1 comprise passive NFC transponders 34, 14. The passive transponders 34, 14 are embodied for instance as passive RFID tags in accordance with ISO 14443 or ISO 15693. The passive NFC transponders comprise in particular at least one transponder antenna, which may be attached to or in the housing 30, 10 of the control device and the drives 1, as well as electronic circuits, such as in particular a non-volatile data memory. With an active NFC module, it is possible to store data on the passive NFC transponder and read them out again, wherein during reading and writing the electronic circuits of the passive NFC transponder are supplied with energy by the active NFC module via inductive coupling. The data stored in the data memory of the passive NFC transponder are retained after being written, even without an energy supply.

Depicted in FIG. 2 and described in greater detail in the following, the passive NFC transponder 14 of a drive 1 is set up to transmit, before a power supply for the drive 1 is switched on, a unique identifier 141 to a mobile service device 2, and to receive from the mobile service device 2 and store one or a plurality of drive parameters. The unique identifier may include, for instance, a serial number of the drive 1. The drive parameters, which are described in greater detail in the following, may include, for instance, a maximum flow, a room designation, etc.

The control module 15 is set up to receive, via the communications module 13, and after a power supply of the drive 1 has been switched on, control signals for controlling the actuator 11 and to control the actuator taking into account the one or plurality of drive parameters, for instance taking into account a maximum flow.

Figure 2:
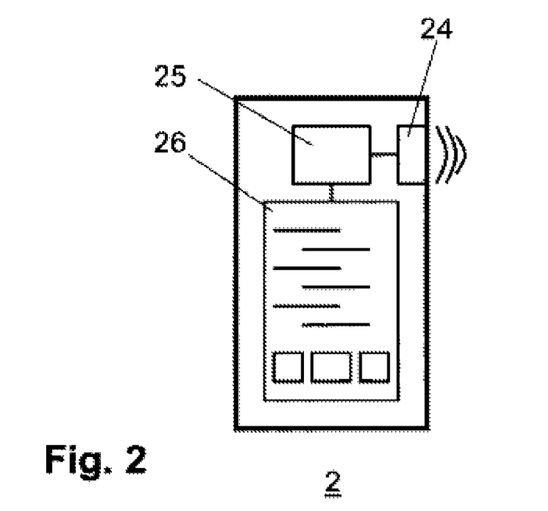
FIG. 2 is a schematic depiction of a mobile service device for configuring an HVAC system.

The NFC transponder 34 of the control device 3 is set up to receive and store, before a power supply for the control device 3 of FIG. 2 is switched on, unique identifiers 341 of the drives 1 from a mobile service device 2 that shall be described in greater detail in the following. The mobile service device has in particular an active NFC module 24 that writes the unique identifiers 341 onto the NFC transponder 34 of the control device 3.

The control module 35 of the control device 3 is set up to access, after a power supply of the control device 3 is switched on, stored identifiers 341, 341', 341", and to transmit control signals via the communications module 33 to components determined by the identifiers. As is depicted in FIG. 1, the control module 35 is connected to the NFC transponder via a signal line in order to read out the identifiers 341, 341', 341" stored in the NFC transponder.

When a power supply of the control device 3 is switched on, the communications module 33, based on the stored identifiers 341, 341', 341", is configured such that communication is enabled with drives 1 that are connected to the communications module 33 via a communications medium.

For reasons of efficiency and quality, the installation of an HVAC system 5 is performed in stages. For instance, water lines or air channels for the HVAC system 5 are installed by specialist technicians in a first stage. Other specialist technicians install control devices and drives in a second stage. Additional specialist technicians install an electrical energy supply for the HVAC system 5 in a third stage. And in a fourth stage, specialist technicians from the second stage, for instance, configure and start up the HVAC system 5, wherein the specialist technicians must in particular re-find the control device and each of the drives in order to set settings that could not be set during the second stage yet because there was no energy supply.

For the control device 3 and the drives 1 in accordance with FIG. 1, it is possible to finish all necessary configurations in the second stage in that first the identifiers for the drives 1 are read and drive parameters are written to the NFC transponder 14 and the read identifiers are written to the NFC transponder of the control device 3. If necessary, additional configuration data are written to the NFC transponder of the control device 3 and the drives 1. Thus it is possible for the specialist technicians to finish, in the second stage, all of the work that requires the individual control devices and drives of the HVAC system 5 to be found. It is thus no longer necessary to find the control devices and drives in the fourth stage when the HVAC system 5 is started up. This makes it possible to improve efficiency and quality during the installation of HVAC systems.

FIG. 2 depicts a mobile service device 2 for configuring a control device 3 of an HVAC system 5 and of one or a plurality of components of the HVAC system 5 before a power supply is switched on. In the following the mobile service device 2 is illustrated in conjunction with components that are embodied as drives 1. The mobile service device 2 comprises a control module 25 that is set up to control an active NFC module 24 of the mobile service device 2 such that an identifier stored in a passive NFC transponder is read out from one or a plurality drives 1, and one or a plurality of read-out identifiers are written to a passive NFC transponder of the control device 3. As is depicted schematically in FIG. 2, the mobile service device comprises a user interface 26 having a touchscreen, a display with keypad, etc. The user interface is set up to display identifiers and drive parameters as well as to receive values for drive parameters. In one embodiment, the mobile service device 2 comprises a suitably programmed mobile telephone, smartphone, etc., that has an active NFC module that is supplied with energy from the battery of the device in question.

Figure 3:
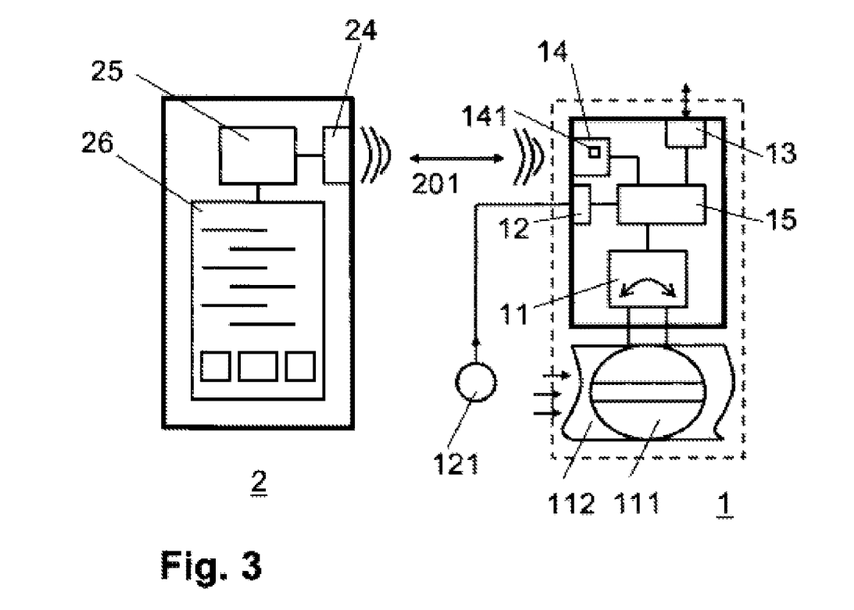
FIG. 3 is a schematic depiction of a drive having a passive NFC transponder that is disposed in the effective range of an active NFC module of a mobile service device.

FIG. 3 is a schematic depiction of a mobile service device 2, wherein the active NFC module cooperates with the NFC transponder 14 of a drive 1 for an HVAC system 5 via the operative connection 201, in particular to read out the unique identifier 141 of the drive 1 and to read and write drive parameters.

Figure 4:
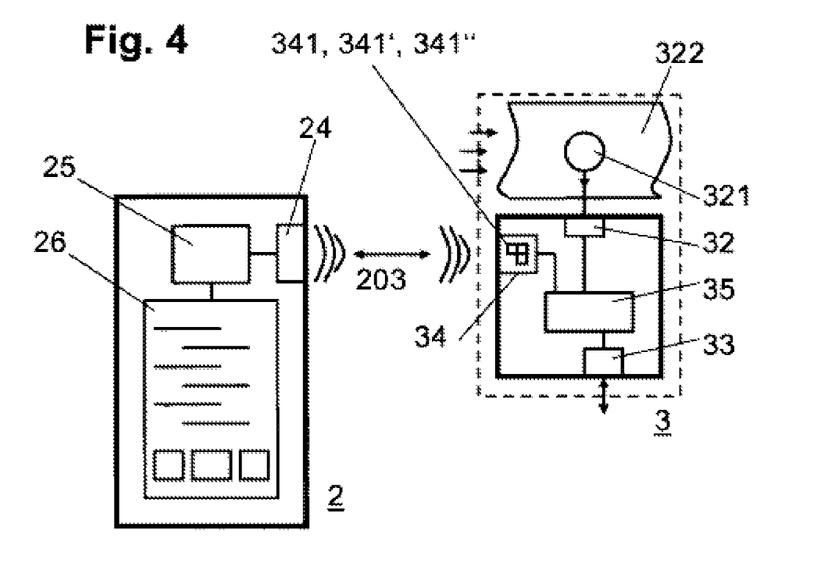
FIG. 4 is a schematic depiction of a control device having a passive NFC transponder that is disposed in the effective range of an active NFC module of a mobile service device.

FIG. 4 is a schematic depiction of a mobile service device 2, wherein the active NFC module cooperates with the NFC transponder 34 of a control device 3 for an HVAC system 5 via the operative connection 203, especially to write identifiers 341, 341', 341" and/or drive parameters to the NFC transponder 34.

Figure 5:
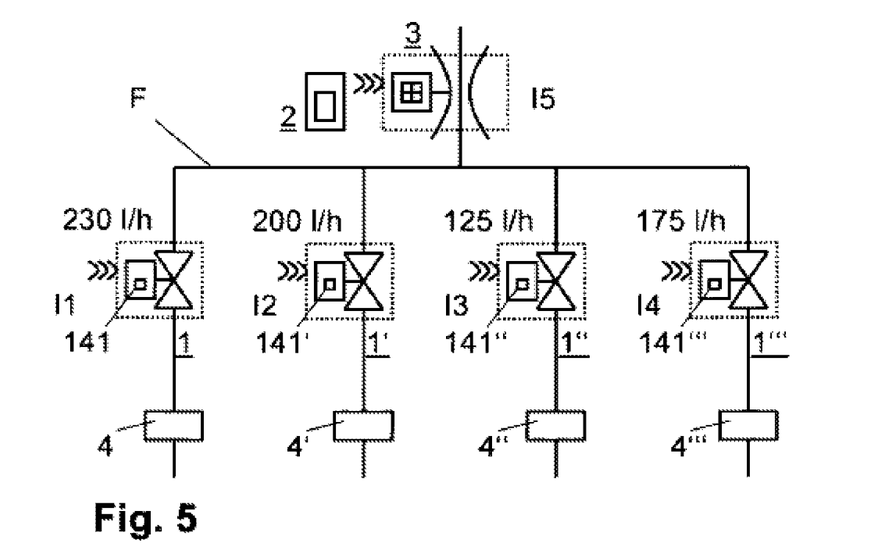
FIG. 5 is a schematic depiction of an installation plan for drives and a control device for an HVAC system.

FIG. 5 is a schematic depiction of an HVAC system 5 that comprises a control device 3 and four drives 1, 1', 1", 1''' to supply consumers 4, 4', 4", 4''' of the HVAC system 5 that are in the fluid system F with a required fluid flow. During the second stage described above, the drives 1, 1', 1", 1''' are installed and configured, wherein the control device 3 and the drives 1, 1', 1", 1''' are not yet connected to a power supply.

As is depicted in FIG. 5, in the installation step 11 the technician first installs the first drive 1. The technician detects the unique identifier 141 of the drive 1 with the mobile service device 2. The technician establishes a maximum flow for the drive 1 on the user interface of the mobile service device 2 and allocates the mobile device to the identifier 141. In the example in accordance with FIG. 5, the maximum flow is 230 l/h. The technician also allocates a room designation to the identifier 141. The maximum flow and the room designation are stored on the mobile service device 2.

In installation steps 12, 13, 14, the technician installs the drives 1', 1", 1''' analogously, wherein in the illustrated example maximum flows of 200 l/h, 125 l/h, and 175 l/h are allocated to the identifiers 141', 141", 141''' together with the room designations and are stored on the mobile service device 2.

In installation step 15, the technician installs the control device 3, which, as indicated schematically, has a flow sensor, to measure the total through-flow in the fluid system F through the consumers 4, 4', 4", 4'''. Furthermore, the technician writes the identifiers, maximum flows, and room designations collected from the drives 1, 1', 1", 1''' to the NFC transponder of the control device 3 with the mobile service device.

Now the installation work is finished for the technician. A protocol produced automatically on the mobile service device 2 during the work that is performed is also transmitted automatically to a receiver, for instance of a project manager who coordinates the installation work. The transmission may be made for instance via a mobile network or via some other communications device.

When reading and writing data to NFC transponders of the mobile service device 2 or drives 1, the mobile service device 2 must only be held against a housing. As soon as an NFC transponder is detected by the mobile service device 2, for instance the identifiers may be read automatically in the case of a drive or the identifiers may be written automatically in the case of a control device and the technician may be provided an acoustic acknowledgement. The NFC effective range in which an NFC transponder may be detected is a few centimeters, for instance less than 10 cm or less than 4 cm.

Figure 6:
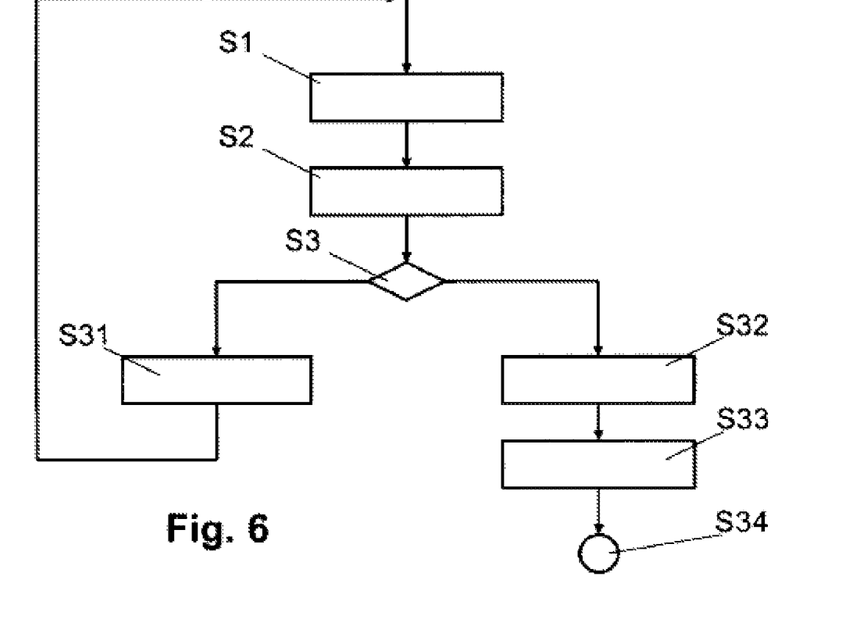
FIG. 6 is a schematic depiction of a flowchart with possible steps for configuring an HVAC system; and, FIG. 7 is a schematic depiction of a drive having a passive NFC transponder and a plurality of transponder antennas.

FIG. 6 is a schematic depiction of a flowchart having a sequence of possible steps for configuring a control device 3 of an HVAC system 5 and one or a plurality of components of the HVAC system 5 before a power supply is switched on. The components are embodied as drives 1 in the depicted example. In step S1, the mobile service device 2 detects whether a passive NFC transponder 34, 14 is disposed in the effective range of an active NFC module. In step S2, a unique identifier is read out of the passive NFC transponder 34, 14 using the active NFC module. In step S3, the unique identifier is analyzed and it is determined whether it relates to a control device 3 or a drive 1. If it relates to a drive 1, step S31 is executed. If it relates to a control device 3, step S32 is executed. In step S31, the unique identifier is displayed on a user interface of the mobile service device 2 and drive parameters of the drive are detected. Once the drive parameters have been detected, they are optionally written to the NFC transponder of the drive using the active NFC module. After step S31, the method is continued with step S1 and it is detected whether a passive NFC transponder 34, 14 is disposed in the effective range of the active NFC module. After step S3, step S32 is executed if analysis of the identifier determines that the identifier relates to a control device 3. In step S32, identifiers that were collected after step S31 was executed multiple times, and the correspondingly detected drive parameters, are written to the passive NFC transponder of the control device 3 using the active NFC module. After step S32, in step S33 a protocol that includes the steps that have been executed is optionally transmitted to a receiver. Thus the drives 1 and the control device 3 are configured such that when a power supply is switched on the HVAC system 5 is controlled according to defined specifications. The method is thus concluded in step S34.

In one variant, prior to a power supply being switched on, in step S31 the drive parameters may be written to the NFC transponder of the drive 1 and in step S32 just the identifiers may be written to the NFC transponder of the control device 3. After a power supply has been switched on, the drive parameters may be queried from the drives 1 by the control device 3, if necessary.

In another variant, before a power supply is switched on, in step S31 no drive parameters are written to the NFC transponder of the drive 1 and in step S32 identifiers and corresponding drive parameters are written to the NFC transponder of the control device 3. After a power supply has been switched on, the drive parameters may be transmitted from the control device 3 to the drives 1, if necessary.

Figure 7:
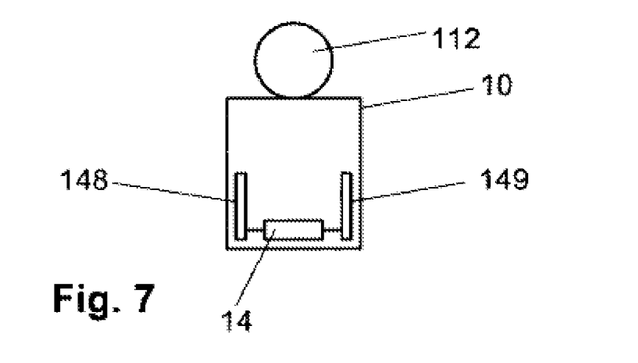

FIG. 7 depicts a housing 10 of a drive 1 with attached fluid connection 112. Of the components of the drive 1 described in the foregoing, only the passive NFC transponder 14 is schematically depicted in FIG. 7. Once the fluid connection 112 has been attached to the HVAC system 5, in a next step the mobile service device 2 must be moved into the effective range of the NFC transponder 14. Depending on the surroundings at the installation site, the drive 1 is not freely accessible on all sides. So that there is an operative connection between the active NFC module of the mobile service device 2 and the NFC transponder 14 of the drive, a plurality of transponder antennas 149, 148 that are arranged on different sides of the housing are provided in the drive 1. Two transponder antennas 149, 148 are depicted in FIG. 7, but it is also possible to arrange three or more transponder antennas 149, 148. If the drive 1 is disposed for instance in a corner that is formed by a ceiling and a wall, then one of the transponder antennas 149, 148 is easily accessible and the operative connection between the active NFC module of the mobile service device 2 and the drive 1 may be effected easily. Analogously, preferably a plurality of transponder antennas are attached to the control device 3 and each of the other components of the HVAC system 5.

The drive parameters, as they were described in the foregoing, relate to one or a plurality of the following readable and/or writable parameters: communications address for the drive, such as e.g. an MP-Bus address, etc.; installation site, such as e.g. room, etc.; responsivity and return hysteresis; type of feedback signal; position range within the mechanical limits; run time relative to work area; rotational angle, direction of rotation; lift, lift direction; work torque relative to maximum possible torque; work actuating force relative to maximum actuating force; emergency position; time delay until emergency position is attained after power failure; counters for determining a number of voltage interruptions; definition of a behavior if the communications module or the communications connection fails; definition of a behavior when a power supply is switched on; definition of a behavior when keys of the drive are actuated.

The drive parameters furthermore relate to the following parameters, which are only readable: unique identifier, such as e.g. serial number; firmware version; total operating time during which the drive was connected to a power supply; active time during which the drive performed mechanical work; stop and go ratio, i.e. the ratio of operating time to active time; and error message, such as e.g. the occurrence of overload events or a change in the adjusting range.

The drive parameters furthermore relate to temperature, humidity, CO2 level, or other sensor values that may be detected by sensors attached to the drive.

In the case of a VAV drive (VAV: variable air volume), the drive parameters furthermore relate to the following readable and writable parameters: box or manufacturer-specific parameter $\Delta p @ V_{nom}$; operating settings for the volume flow (minimum, nominal, and maximum); and the definition of the behavior when the disengage key for the gearing is actuated.

In the case of an EPIV drive (EPIV: electronic pressure independent valve), the drive parameters furthermore relate to the following readable and writable parameters: through-flow regulation or open loop operation; control signal inverted or non-inverted; non-linear characteristic values (volumes, percentages, volume per unit of time); type of feedback signal; size of the valve; and operation settings (minimum, nominal, maximum).

The following readable and writable parameters may be provided on a control device: installation site, such as e.g. room, etc.; list of identifiers, such as e.g. serial numbers of the drives; group designation; operating mode; and definition of error functions/additional messages.

In one variant of the drive 1, the passive NFC transponder is set up to receive and store drive parameters of a plurality of drives 1 in the HVAC system 5. Thus the drive parameters of the drives in the HVAC system 5 are stored redundantly in the drives 1. In addition, other parameters of components for the HVAC system 5 may be stored redundantly in the NFC transponder for the drives 1, for instance, data that describe the structure of the HVAC system 5, etc. When a power supply is switched on, it is enough for the control device 3 to be able to read out the data of a single drive 1 in order to access the drive parameters for all of the drives. This results in especially robust behavior when the HVAC system is switched on, because it is not necessary to search for individually attached drives using a possibly complicated communications protocol.

As mentioned, the NFC transponder may be arranged outside of the housing of a drive 1 or control device 3, wherein the NFC transponder is connected to the drive 1 or control device 3 via a cable. This may improve accessibility to the NFC transponder with the mobile service device 2. And it may improve accessibility both before and after a power supply is switched on.

In one variant, an NFC extender that is activated after a power supply is switched on may be provided on the control device 3 or on the drive 1. The NFC extender comprises an active NFC module and some type of extender interface, such as e.g. Bluetooth, WLAN, etc. The active NFC module and the extender interface are active after the power supply is switched on in order to establish a configuration connection between the mobile service device 2 and the NFC transponder from the mobile service device via the extender interface and the active NFC module for reading and writing data. This may simplify service work in the operation of the HVAC system, since the mobile service device 2 does not have to be brought directly to the drive 1 or to the control device 3, which are often only accessible with a lead.

REFERENCE NUMBERS

1 Drive for HVAC system
10 Housing for drive
11 Actuator
111 Control element
112 Fluid connection for the drive
12 Sensor interface for the drive
121 Sensor, attachable to sensor interface of the drive
13 Communications module for the drive
14 Passive NFC transponder for the drive
141 Unique identifier stored on the NFC transponder for the drive
15 Control module for the drive 2 Mobile service device
24 Active NFC module of the mobile service device
25 Control module for the mobile service device
26 User interface of the mobile service device
3 Control device for the HVAC system
30 Housing for the control device
32 Sensor interface for the control device
321 Fluid sensor for the control device
322 Fluid connection for the control device
33 Communications module for the control device
34 Passive NFC transponder for the control device
341 Unique identifier stored on the NFC transponder of the control device
35 Control module for the control device
4 Consumer of the HVAC system
5 HVAC system
F Fluid system of the HVAC system

The invention claimed is:

1. A control device (3) for a Heating, Ventilation, and Air Conditioning (HVAC) system (5), wherein the control device (3) has a communications module (33) for communicating with one or a plurality of components in the HVAC system (5), comprising:
 a passive Near Field Communication (NFC) transponder (34) that is set up to receive and store a unique identifier (341) for each of the one or plurality of components from a mobile service device (2) prior to a power supply for the control device (3) being switched on, and
 a control module (35) that is set up to access unique identifiers (341) stored in the passive NFC transponder (34) after a power supply for the control device (3) has been switched on and to transmit control signals to components determined by the unique identifiers via the communications module (33).

2. The control device (3) in accordance with claim 1, characterized in that the passive NFC transponder (34) and the control module (35) are set up to receive and store unique identifiers and to transmit control signals related to one or a plurality of the following components: a sensor device of the HVAC system (5), a drive (1) of the HVAC system (5), a regulating device of the HVAC system (5), a room control unit of the HVAC system (5), a gateway for communication between different communications networks of the HVAC system (5), an actuator of the HVAC system (5), and an interface device for input and output signals of the HVAC system (5).

3. The control device (3) in accordance with claim 1, characterized in that the control module (35) is set up to transmit, after a power supply for the control device (3) is switched on, control signals to components determined by the unique identifiers, which control signals query whether the component in question is available.

4. The control device (3) in accordance with claim 1, characterized in that the passive NFC transponder (34) is set up to receive and store component parameters allocated to the unique identifiers (341), wherein the control module (35) is set up to transmit control signals corresponding to the component parameters to components determined by the unique identifiers.

5. The control device (3) in accordance with claim 1, characterized in that the control module (35) is set up to transmit control signals to components, which control signals query component parameters of the components, wherein the control module (35) is set up to transmit control signals corresponding to the component parameters to components determined by the unique identifiers.

6. The control device (3) in accordance with claim 1, characterized in that the control module (35) is set up to produce a protocol that includes one or a plurality of the following contents: a switch-on time for a power supply for the control device (3), a query time, and status of the availability of components and component parameters, with information about whether they are stored on the passive NFC transponder or were queried at a component.

7. The control device (3) in accordance with claim 6, characterized in that the control module (35) is set up to execute one or a plurality of the following steps: transmit the protocol to a receiver if a communications link to the receiver is available, and store the protocol on the passive NFC transponder (34).

8. The control device (3) in accordance with claim 1, characterized in that the control module (35) is set up to detect operating values (121, 321) of the HVAC system (5) of the components determined using the unique identifiers and to transmit control signals to related components corresponding to the detected operating values (121, 321).

9. The control device (3) in accordance with claim 1, comprising one or a plurality of the following components: a sensor device for the HVAC system (5), a drive (1) for the HVAC system (5), a regulating device for the HVAC system (5), a room control unit for the HVAC system (5), a gateway for communication between different communications networks of the HVAC system (5), an actuator for the HVAC system (5), and an interface device for input and output signals of the HVAC system (5).

10. A method for configuring a Heating, Ventilation, and Air Conditioning (HVAC) system (5), comprising:
 reading out an identifier from a passive Near Field Communication (NFC) transponder of one or a plurality of components of the HVAC system (5) with an active NFC module before a power supply of the HVAC system (5) is switched on, and
 writing read-out identifiers to a passive NFC transponder of a control device (3) of the HVAC system (5) with the active NFC module before the power supply of the HVAC system (5) is switched on.

11. The method in accordance with claim 10, characterized in that identifiers are displayed on a user interface, in that component parameters allocated to the identifiers are detected, and in that detected component parameters are written to a passive NFC transponder (14) of the one or plurality of components and/or to the passive NFC transponder (34) of the control device (3) with the active NFC module before the power supply of the HVAC system (5) is switched on.

12. The method in accordance with claim 10, characterized in that a protocol is produced that comprises one or more of the following contents: read-out identifiers of the one or plurality of components, component parameters allocated to the identifiers, and time stamps allocated to these contents, wherein the protocol is transmitted in particular to a receiver.

13. A computer program product comprising a non-transitory computer-readable storage medium that has program code stored thereon and that is set up to control one or a plurality of processors of a mobile service device (2) that has an active Near Field Communication (NFC) module (24) such that:
 an identifier is read out of a passive NFC transponder of one or a plurality of components of a Heating, Ventilation, and Air Conditioning (HVAC) system (5) with the active NFC module, without a power supply for the HVAC system (5) being switched on for this purpose, and read-out identifiers are written to a passive NFC transponder of a control device (3) of the HVAC system (5) with the active NFC module without the power supply for the HVAC system (5) being switched on for this purpose.

14. A drive (1) for a Heating, Ventilation, and Air Conditioning (HVAC) system (5), wherein the drive (1) has an actuator (11) for a control element (112) of the HVAC system (5), comprising:

a passive Near Field Communication (NFC) transponder (14) that is set up to transmit a unique identifier (141) to a mobile service device (2) before a power supply for the drive (1) is switched on and to receive and store from the mobile service device (2) one or a plurality of drive parameters, and a control module (15) that is set up to control the actuator after a power supply for the drive (1) is switched on, taking into account the one or plurality of stored drive parameters, wherein the passive NFC transponder is set up to receive and store drive parameters from a plurality of drives (1) of the HVAC system (5).

15. The drive (1) in accordance with claim 14, further comprising a communications module (13) for communicating with a control device of the HVAC system (5), characterized in that the control module (15) is set up to receive via the communications module (13), and before a power supply for the drive (1) is switched on, control signals for controlling the actuator (11) and to control the actuator.

16. The drive (1) in accordance with claim 15, characterized in that the control module (15) is set up to transmit a confirmation to the control device (3) after a power supply for the drive (1) is switched on and upon receipt via the communications module (13) of a control signal from a control device (3), with which signal the availability of the drive (1) is checked.

17. The drive (1) in accordance with claim 15, characterized in that the control module (15) is set up to transmit the one or a plurality of drive parameters to the control device (3) upon receipt via the communications module (13) of a control signal from a control device (3), with which control signal the one or plurality of drive parameters are queried.

18. The drive (1) in accordance with claim 15, characterized in that the control device (15) is set up to detect operating values (121) of the HVAC system (5) via a sensor interface (12) and to transmit these operating values (121) to a control device (3) via the communications interface.

19. The drive (1) in accordance with claim 14, characterized in that the passive NFC transponder has a plurality of differently arranged transponder antennas.

20. The drive (1) in accordance with claim 14, characterized in that the passive NFC transponder has two transponder antennas that are attached to or in the housing of the drive (1) such that at least one of the two transponder antennas remains freely accessible after the drive (1) is assembled, especially on a side of the housing of the drive (1) that faces a wall or cover.

* * * * *